United States Patent
Weichsel et al.

(10) Patent No.: US 11,180,109 B2
(45) Date of Patent: Nov. 23, 2021

(54) LOCKING DEVICE FOR A MOVABLE PART OF A VEHICLE

(71) Applicant: Kiekert AG, Heiligenhaus (DE)

(72) Inventors: Ulrich Weichsel, Duisburg (DE); Holger Schiffer, Meerbusch (DE); Ömer Inan, Dorsten (DE); Elena Suholutskaja, Düsseldorf (DE)

(73) Assignee: Kiekert AG, Heiligenhaus (DE)

( * ) Notice: Subject to any disclaimer, the term of this patent is extended or adjusted under 35 U.S.C. 154(b) by 0 days.

(21) Appl. No.: 16/651,100

(22) PCT Filed: May 25, 2018

(86) PCT No.: PCT/DE2018/100513
§ 371 (c)(1),
(2) Date: Mar. 26, 2020

(87) PCT Pub. No.: WO2019/063036
PCT Pub. Date: Apr. 4, 2019

(65) Prior Publication Data
US 2020/0231113 A1    Jul. 23, 2020

(30) Foreign Application Priority Data
Sep. 28, 2017   (DE) .................... 10 2017 122 573.0

(51) Int. Cl.
*B60R 21/38*      (2011.01)
*E05B 77/08*      (2014.01)
(Continued)

(52) U.S. Cl.
CPC .............. *B60R 21/38* (2013.01); *E05B 77/08* (2013.01); *B60R 2021/343* (2013.01);
(Continued)

(58) Field of Classification Search
CPC ... B60R 21/38; B60R 2021/343; E05B 77/08; E05B 83/24; E05B 83/243;
(Continued)

(56) References Cited

U.S. PATENT DOCUMENTS

2013/0087401 A1* 4/2013 Masih ................. E05B 17/0062
180/274
2014/0345963 A1* 11/2014 Ferri ......................... E05F 7/00
180/274

(Continued)

FOREIGN PATENT DOCUMENTS

DE       102005060750 A1     6/2007
DE           10318796 B4     4/2008
(Continued)

OTHER PUBLICATIONS

Description Translation of DE 102011076770 from Espacenet (Year: 2011).*
Translation of International Search Report dated Aug. 16, 2018 for International Patent Application No. PCT/DE2018/100513.

*Primary Examiner* — James A English
*Assistant Examiner* — Daniel M. Keck
(74) *Attorney, Agent, or Firm* — Renner, Otto, Boisselle & Sklar, LLP

(57) ABSTRACT

A locking device for a movable part of a vehicle, in particular for a bonnet of a vehicle, having a locking mechanism which can be mounted on the body side and intended for receiving a lock holder arranged on the movable part, and also having a raising mechanism which can be brought into contact with the lock holder and intended for moving the movable part into at least one protection position, wherein the raising mechanism has at least a first overload protector, with the result that, in a load situation, the movable part is movable from the protection position into an impact position.

20 Claims, 6 Drawing Sheets

Figure 1:
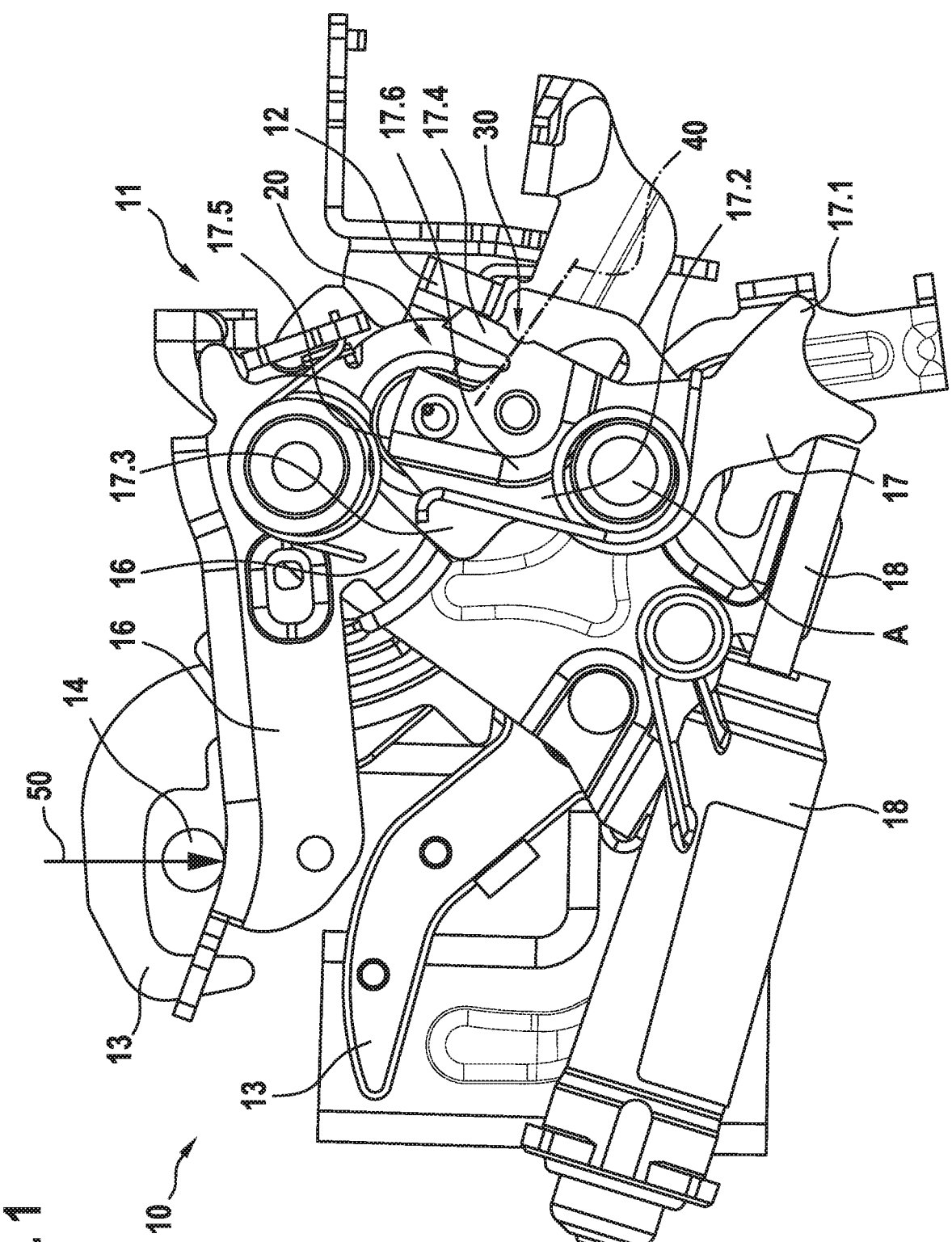

(51) Int. Cl.
*B60R 21/34* (2011.01)
*B62D 25/12* (2006.01)
*E05B 83/24* (2014.01)
*E05D 11/00* (2006.01)
*E05B 17/00* (2006.01)
*E05B 51/02* (2006.01)
*E05B 81/02* (2014.01)

(52) U.S. Cl.
CPC .............. *B62D 25/12* (2013.01); *E05B 83/24* (2013.01); *E05D 2011/009* (2013.01); *E05Y 2900/536* (2013.01)

(58) Field of Classification Search
CPC ............ E05B 17/0054; E05B 17/0062; E05B 51/023; E05B 81/02; B62D 25/12; E05D 2011/009; E05Y 2900/536
See application file for complete search history.

(56) References Cited

U.S. PATENT DOCUMENTS

2017/0259776 A1* 9/2017 Mclundie ................ B60R 21/38
2019/0338567 A1* 11/2019 Szente .................... E05B 77/12

FOREIGN PATENT DOCUMENTS

| | | | | |
|---|---|---|---|---|
| DE | 102011076770 | A1 | 12/2012 | |
| DE | 102011114148 | A1 | 3/2013 | |
| DE | 102007021840 | A1 | 8/2014 | |
| DE | 102014219758 | A1 * | 9/2015 | ............ B60R 21/38 |
| DE | 102015118861 | A1 | 5/2017 | |
| EP | 2481645 | A1 | 8/2012 | |
| JP | 2016175548 | A | 10/2016 | |
| KR | 20100006257 | A | 1/2010 | |
| KR | 101449334 | B1 * | 10/2014 | ............ B62D 25/12 |

* cited by examiner

LOCKING DEVICE FOR A MOVABLE PART OF A VEHICLE

The present invention relates to a locking device for a movable part of a vehicle according to the preamble of the first independent claim as well as a method of actuation for a locking device in a movable part of a vehicle according to the independent method claim.

Accidents involving people, i.e., between a motor vehicle and a pedestrian, normally lead to serious injuries for the pedestrian, in particular as a result of the pedestrian impacting the engine cover of the vehicle.

Publications DE 10318796 B4, DE 10 2011 114 148 A1, EP 248 1645 A, and KR 2010 0006 257 A disclose engine cover locks with pedestrian impact protection.

However, the drawback of the solutions known from the prior art is that the designs of these locking devices are complex and expensive.

The object of the present invention is to at least partially overcome the aforementioned drawbacks known from the prior art. It is furthermore the object of the present invention to provide a cost-effective locking device for a movable part of a vehicle having an overload protector and extended functionality.

The preceding object is achieved by means of a locking device for a movable part of a vehicle according to the independent device claim and a method of actuation having the features of the independent method claim.

Further features and details of the invention follow from the dependent claims, the description, and the drawings. In this context, features and details which are described in connection with the device according to the invention are obviously also applicable in connection with the method according to the invention and vice versa, so mutual reference is always made or may be made with respect to the individual aspects of the invention.

Advantageous refinements and improvements of the subject matter of the invention which are specified in the independent claims are made possible by means of the measures explained in the independent claims.

According to the invention, the locking device for a movable part of a vehicle, in particular for a bonnet of a vehicle, has a locking mechanism which can be mounted on the body side and is intended for receiving a lock holder arranged on the movable part, and also has a raising mechanism which can be brought into contact with the lock holder and is intended for moving the movable part into at least one protection position, with the raising mechanism having at least one overload protector which enables the movable part to, in a load condition, be moved from the protection position into an impact position.

In the context of the invention, the term "movable part of a vehicle, in particular a bonnet" is intended to mean, for example, an engine cover or a trunk lid, in particular for the areas of a vehicle arranged in front (in the direction of travel) of the passenger cabin.

According to the invention, a locking mechanism is composed of a rotary latch and at least one pawl, which fix the lock holder in a closed position of the movable part and release it in an open position. The closed position of the movable part is assumed during operation of the vehicle. For example, in the case of an engine cover, the visible outer side of the latter can be arranged to be flush with the adjacent vehicle body in the closed position that is provided. When in the closed position that is provided, the inner side of an engine cover is normally at a predetermined distance from the adjacent vehicle body so that, without the locking device, the engine cover would be able to move beyond the closed position that is provided and towards the vehicle body, possibly hitting the vehicle body.

The protection position is normally at a distance from the closed position that is provided, i.e., towards (in the opening direction of movement) the open position that is provided, with the result that only a flat human hand can be inserted between the engine cover and the vehicle from the outside. In this context, "only flat" means that the hand's surface is oriented parallel to the engine cover and/or a hand held perpendicular to the engine cover cannot be inserted between the engine cover and the vehicle body.

A relevant pedestrian accident, in which the pedestrian impacts the engine cover, results in a force on the lock holder of the movable part, with the result that the lock holder exerts a force on the locking mechanism. As a consequence, the movable part is moved towards the engine compartment and thus beyond the closed position.

The result of a raising mechanism according to the invention is that the movable part is then able to move from a closed position into a protection position. As a consequence, the movable part is moved by means of the raising mechanism towards the open position of the movable part.

It is conceivable that, for the protection position, the movable part is elevated—compared to the closed position—between approximately 10 mm and 50 mm, preferably between 15 mm and 40 mm, and particularly preferably between 20 mm and 30 mm.

According to the invention, the raising mechanism comprises at least one first overload protector which enables the movable part to, in a load condition, move from the protection position into an impact position. As a result, the movable part is able to move out of the protection position, in which the movable part is arranged to be elevated by the aforementioned elevation distance, and back towards the closed position. As a consequence, the movable part in a load condition, for example a pedestrian accident in which the pedestrian impacts the engine cover, is moved into an impact position. At least part of the kinetic energy of the pedestrian is thereby absorbed by the movable part. As a consequence, an impact position enables the movable part to reduce the risk of pedestrian injury.

The overload protector according to invention, which is on the raising mechanism, enables a form of pedestrian protection or cyclist protection in which a targeted deformation of the raising mechanism can be achieved, with said deformation being independent of the weight of the movable part. Regarding the overload protector according to the invention, only the force which is exerted on the movable part during a load condition acts to lower the movable part, thus acting to move the movable part from the protection position into the impact position.

One technical effect of the raising mechanism according to the invention having at least one first overload protector is enabling the movable part to move from the protection position into an impact position only during a load condition. A force- and load-dependent overload protector can be provided in a corresponding manner. As a result, the invention enables the movable part to move from the protection position into the impact position only when experiencing the application of force foreseen during a load condition. A targeted, i.e. load-dependent, activation of said pedestrian protection is achieved as a result.

The raising mechanism according to the invention can primarily comprise a raising lever, a drive lever which is connectable to the raising lever and the locking mechanism, in particular a pawl, and an activation means which can be brought into contact with the drive lever. The drive lever is preferably pretensioned by means of a spring. The raising lever of the raising mechanism cooperates in this case with the lock holder so that, for the impact position, the raising lever moves the lock holder of the movable part towards the open position of the movable part. The raising lever can for this purpose be brought into contact with a drive lever, in which case the drive lever transmits force from an activation means to the raising lever so as to exert force on the lock holder.

The drive lever is rotatably mounted and able to be brought into cooperative engagement with an activation means so that, in accident situations, the activation means applies force to the drive lever in such a way that the drive lever actuates the raising lever and, as a result, the lock holder moves the movable part towards the open position. Moreover, the drive lever is able to be brought into contact with the locking mechanism, in particular a pawl.

The activation means can, for example, be an electromagnetically or pyrotechnically actuable activation means. Depending on the embodiment of the activation means, various advantages will result. In the case of an electromagnetically actuated activation means, the activation means can be employed reversibly, whereas very strong forces and velocities can be achieved in the case of a pyrotechnically actuated application.

The term "load condition" describes the case in which, for example, a pedestrian accident takes place, as a result of which an excessive load is exerted on the movable part. However, this excessive load can also be exerted because of improper use, as when the user slams the engine cover with particularly great force. The term "load" means a force which the lock holder exerts on the locking device during a movement towards the locking device and, as a result, towards the closed position.

The term "excessive load" means a force above a threshold load, i.e., a threshold for a force. The threshold load for even a high acceleration can be described by the known correlation between mass, acceleration, and force if the mass of the movable part is known and no other additional weight, for example the load of a pedestrian during a pedestrian crash, is added to the engine cover.

The term "lowered position beyond the closed position," i.e. the impact position, means that the lock holder movement is towards the locking and closing device. The term "lowered" means a movement in the closing direction, e.g., a movement of the lock holder towards the raising lever.

Given an excessive load or overload, the lock holder strikes or pushes against the raising lever with a force greater than the threshold load, with the result that the threshold load is exceeded. The movement of the lock holder towards the raising lever is then continued along a movement path, in particular in a uniform manner.

The overload protector according to the invention then makes it possible for the impact position of the movable part to be reached only when the threshold value, i.e. the threshold load, is exceeded. As a consequence, the overload protector limits the movement of the movable part into the impact position in a load-dependent manner, with the result that only given an excessive load can the lock holder and, therefore, the movable part move from the protection position towards the impact position and, therefore, also towards the closed position. The yielding of the movable part achieved thereby can reduce injuries to a pedestrian during an impact on the engine cover.

The overload protector preferably enables a plastic deformation on the raising mechanism.

It is further conceivable for the overload protector to be arranged on the drive lever. A plastic deformation acts accordingly on one area of the drive lever. If a threshold value or a threshold load of the movable part is reached, then the raising lever of the raising mechanism acts on the drive lever, in which context the drive lever is designed to have the overload protector according to the invention, and the latter acts to lower the movable part towards the impact position after the threshold load has been reached.

During a pedestrian accident and, therefore, a threshold load being generated on the movable part, the drive lever is supported in one respect on the raising lever and in another respect on a pawl of the locking mechanism. The force/threshold force is applied to the raising lever by the lock holder, and the raising lever transmits said force to the guide lever. The guide lever is in turn supported on the pawl of the locking mechanism and, as a result, transmits the threshold force from the guide lever to the pawl.

According to the invention, the overload protector is then arranged on the guide lever so that, when the threshold load on the movable part is exceeded, a force acts on the guide lever, and the guide lever undergoes a plastic deformation. This preferably takes place by virtue of the guide lever being supported on the pawl and, as a result, experiencing a force from the raising lever such that being supported on the pawl causes a plastic deformation of the guide lever.

The overload protector on the drive lever is preferably designed as an intended breaking point, in particular in the form of a material recess on the drive lever. This intended breaking point thus enables a plastic deformation of the drive lever on the overload protector. The intended breaking point of the drive lever can in this case be dimensioned in such a way that the drive lever can deform in a plastic manner at a predefined force value/threshold load. Particularly preferably, the overload protector and, therefore, the intended breaking point is designed as a material recess on the drive lever since this is straightforward and cost-effective to produce. Particularly preferably, the cross-section of the drive lever is reduced in the area of the overload protector so that a plastic deformation of the drive lever can be generated at a defined threshold load.

In a load condition, the drive lever can preferably deform in a plastic manner along a bending axis. By providing the intended breaking point, in particular the material recess on the drive lever, a complex mechanism enabling the lock holder to lower into the locking device can be avoided, thus allowing the number of parts necessary for the additional pedestrian protection function to be reduced.

An intended breaking point is normally an area with a tapered cross-section where the greatest material stresses arise under a load, so the overload protector will fail, e.g. deform in a plastic manner or break, at this point, hence at the intended breaking point.

In this context, bending can mean folding or buckling about a bending axis such that, near the contact area, the drive lever is intertwined with the pawl about a bending axis. In particular, a plastic deformation therefore takes place along the bending axis or near the bending axis.

In a load condition and, therefore, when the threshold load has been exceeded, the yield strength of the guide lever is exceeded in the area of the overload protector, in particular at the intended breaking point, so the material of the drive lever will begin to flow and deform in a plastic manner at that location.

The threshold load correlates to the yield strength of the material of the drive lever in the area of the overload protector and the material thickness/cross-section in this area of the drive lever.

According to the invention, it can be provided that the drive lever comprises an activation arm and a raising arm, in which case the raising arm comprises an actuating element able to be brought into contact with the raising lever and a support element able to be brought into contact with the locking mechanism, in particular the pawl, and the overload protector, in particular the intended breaking point, is formed on a guide contour of the drive lever which connects the actuating element and the support element.

As previously mentioned, the drive lever is in operative engagement, or rather contact, with an activation element and the raising lever. Moreover, contact between the raising lever and the pawl can be provided. An activation arm of the drive lever is in this case the part of the drive lever which is able to be brought into contact with the activation means such that force can be transmitted from the activation means to the drive lever via the activation arm. The raising arm of the drive lever is able to be brought into contact with the raising lever of the raising mechanism so that, by means of force exerted on the activation arm of the drive lever by the activation means, force can be transmitted to the raising lever via the raising arm of the drive lever, and the raising lever can raise the lock holder, and therefore the movable part, into a protection position.

According to the invention, the overload protector, in particular the intended breaking point, can then be formed on a support contour of the drive lever which connects the actuating element and the support element. As a consequence, the overload protector, in particular the intended breaking point, is arranged between the contact point for the drive lever and the pawl and the contact point for the drive lever and the raising lever. The area between the two contact points described can thus comprise the intended breaking point, so the drive lever is able to deform in a plastic manner in this area if the threshold load on the movable part is exceeded.

In the context of the invention, the locking mechanism, in particular the pawl, can glide along the support contour at least during a movement of the movable part from the impact position into the protection position, a closed position, and/or an open position. As a consequence, the pawl of the locking mechanism can be in contact with the support contour of the guide lever during a movement of the movable part from the impact position into the protection position, the closed position, and/or the open position, with the result that the pawl is supported on the drive lever in the area of the support contour. In this case, only portions of the pawl can be supported on the drive lever, or only portions thereof can be supported on the support contour.

The support contour of the drive lever thus enables a guided movement of the pawl along at least portions of the drive lever.

A guide element having a guide contour can be advantageously arranged on the overload protector, in particular the intended breaking point, of the drive lever, in which case the guide contour is able to be brought into contact with the pawl during a movement of the movable part from the impact position into the protection position, a closed position, and/or an open position. In this case, the guide element is arranged on the drive lever in such a way that at least portions of the guide element are located in the area of the overload protector, in particular the intended breaking point of the drive lever, and can be arranged in a positively locking manner on the support contour of the drive lever.

While forming the overload protector, in particular in the form of an intended breaking point or a material recess on the drive lever, the guide element enables the pawl to nevertheless slide along the guide contour or support contour of the drive lever. For this purpose, the guide element is arranged on the drive lever in such a way that the movement of the drive lever, or rather the movement of the pawl along the drive lever, can be performed essentially without interruption.

As a consequence, the guide element prevents the pawl from possibly being guided into the material recess of the intended breaking point, or rather the overload protector, thus enabling the latching mechanism of the locking device to tilt. As a consequence, the functional reliability of the locking device is further improved by the guide element.

It is furthermore conceivable that, in a load condition, the actuating means is deformed, in particular bent, within the overload protector, in particular within the intended breaking point or material recess, in which case the guide element preferably comprises a recess for the actuating means so that the actuating means can be arranged within the recess in a load condition. This means that, after the plastic deformation, the actuating means is deformed, bent, or broken within the recess of the guide element. Accordingly, the guide element can for this purpose comprise a recess which enables the actuating element to be accommodated in an essentially positively locking manner. As a consequence, if during a load condition the actuating element is supported by the pawl in such a way that the actuating element is deformed in a plastic manner, then said plastic deformation takes place towards the recess of the guide element. In this case, the plastic deformation can, for example, also be interrupted (or a further accommodation of force hindered) by the recess of the guide element. Moreover, the recess of the guide element enables the actuating element of the drive lever to be deformed in a plastic manner only as far as the position within the recess, thus enabling a certain degree of guidance for the plastic deformation of the actuating element.

In the context of the invention, the drive lever, in particular the actuating element, can comprise at least one second overload protector. In particular, the second overload protector is designed as a notch on the actuating element or the drive lever. The threshold load can be further defined or influenced via the notch and, therefore, via the overload protector. As a consequence, the holding force of the raising lever can be influenced via the first and second overload protectors. The plastic deformation is essentially definable by means of the intended breaking point and by means of the second overload protector, which is preferably designed as a notch.

According to a further aspect of the invention, a method of actuation for a locking device according to the first aspect of the invention (a movable part of a vehicle) is claimed.

Accordingly, all of the advantages previously described in detail with respect to the locking device according to the invention apply to the method according to the invention.

This method of actuation is intended for an accident-related load condition in which the movable part is located in a protection position, said method comprising at least the following steps:
   a) rotating a vehicle-side raising lever about an axis while transmitting a defined impact force from a lock holder arranged on the movable part to the vehicle-side raising lever, b) rotating a drive lever about a further axis while applying a load torque from the raising lever to the drive lever,
c) triggering at least one overload protector on the drive lever,
d) lowering the movable part from the protection position into an impact position.

Further measures for improving the invention follow from the description hereinafter regarding several embodiments of the invention, which are schematically illustrated in the drawings. All of the features and/or advantages as well as spatial arrangements and method steps arising from the claims, the description, or the drawings may be essential to the invention either by themselves or in widely varying combination. In this context, it should be noted that the drawings are only descriptive in nature and are not intended to restrict the invention in any way.

In the following embodiments, like or equivalent elements are described using like reference signs, and duplicate descriptions thereof will be avoided.

Figure 2:
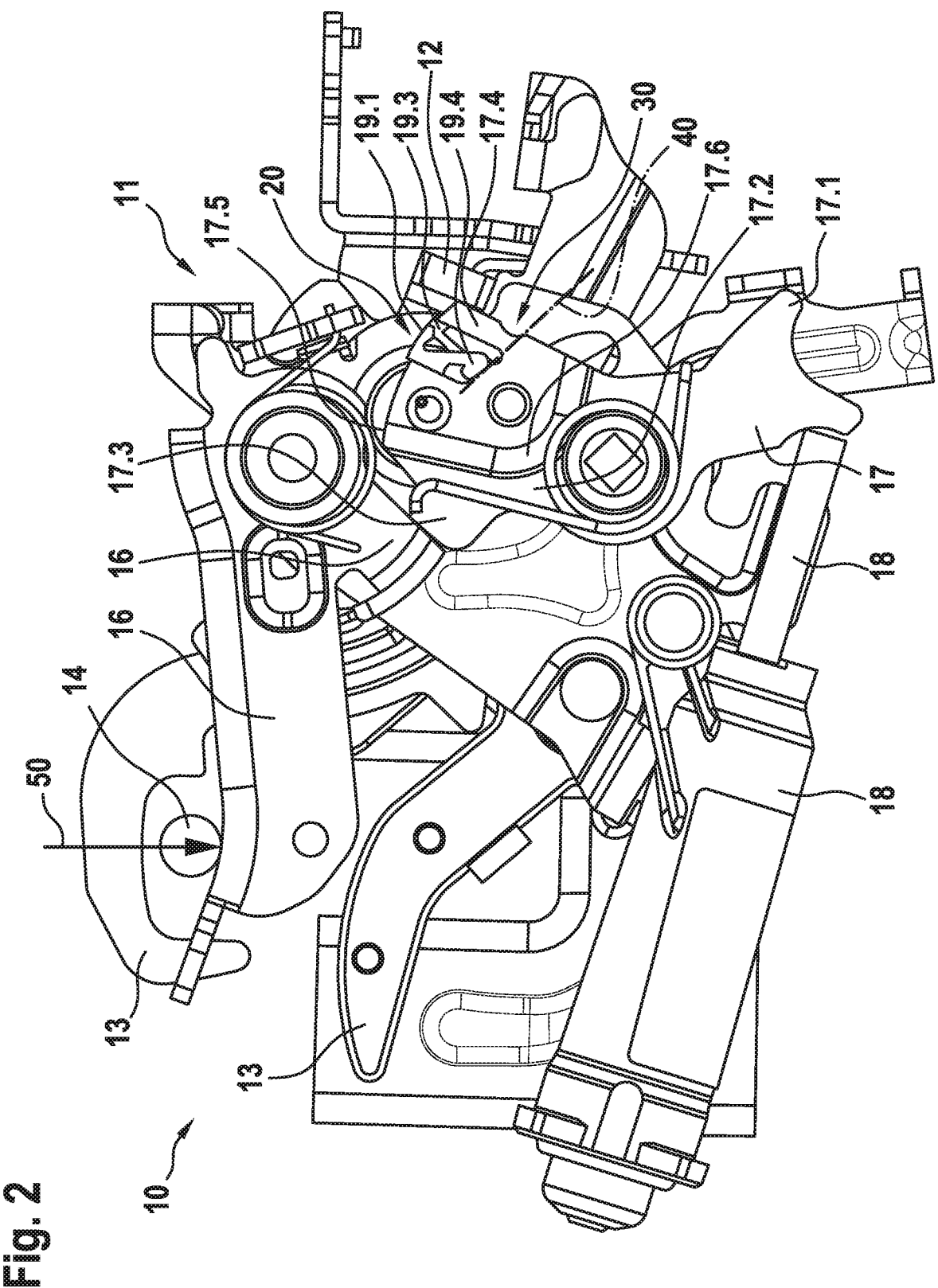
Figure 3:
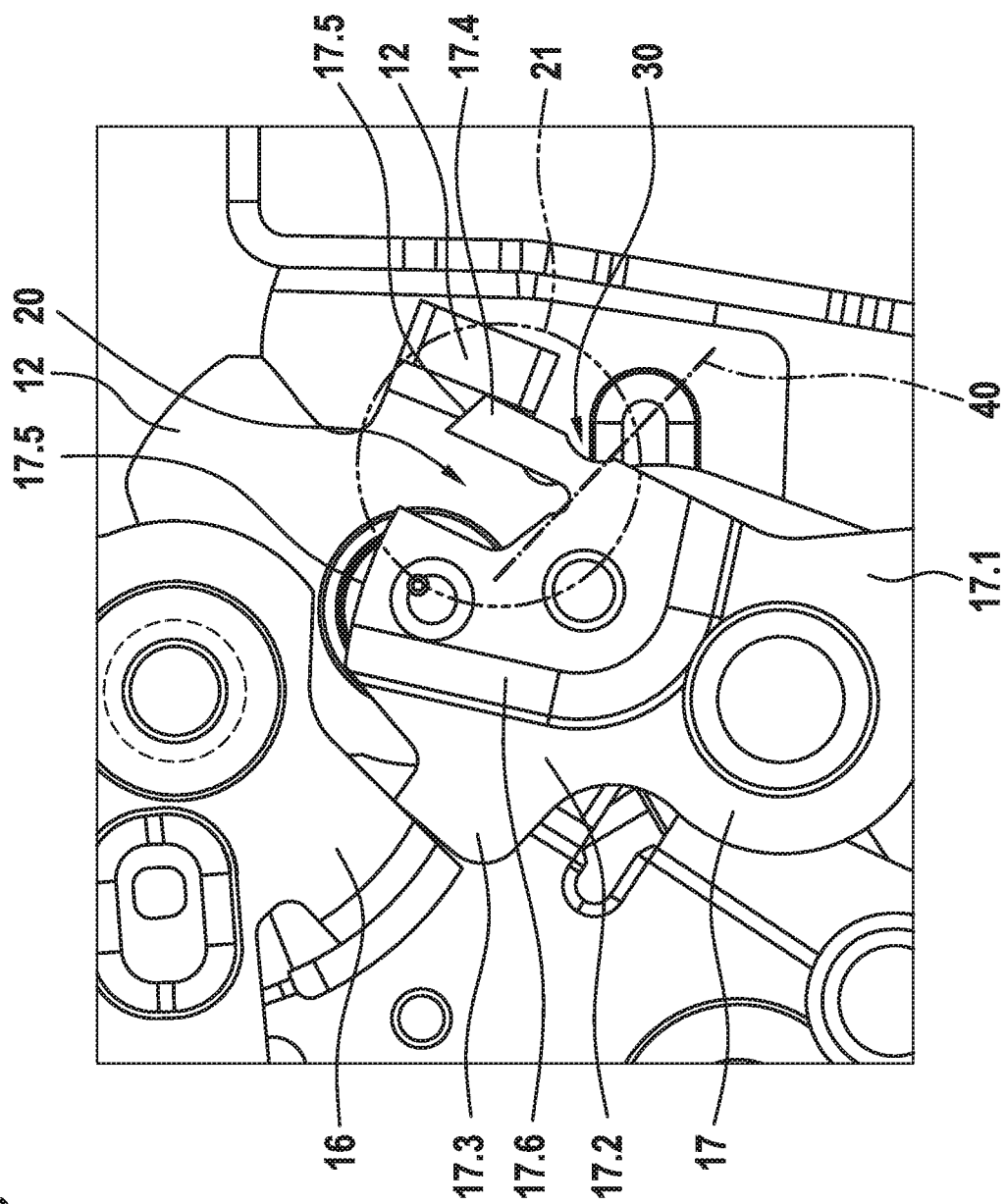
Figure 4:
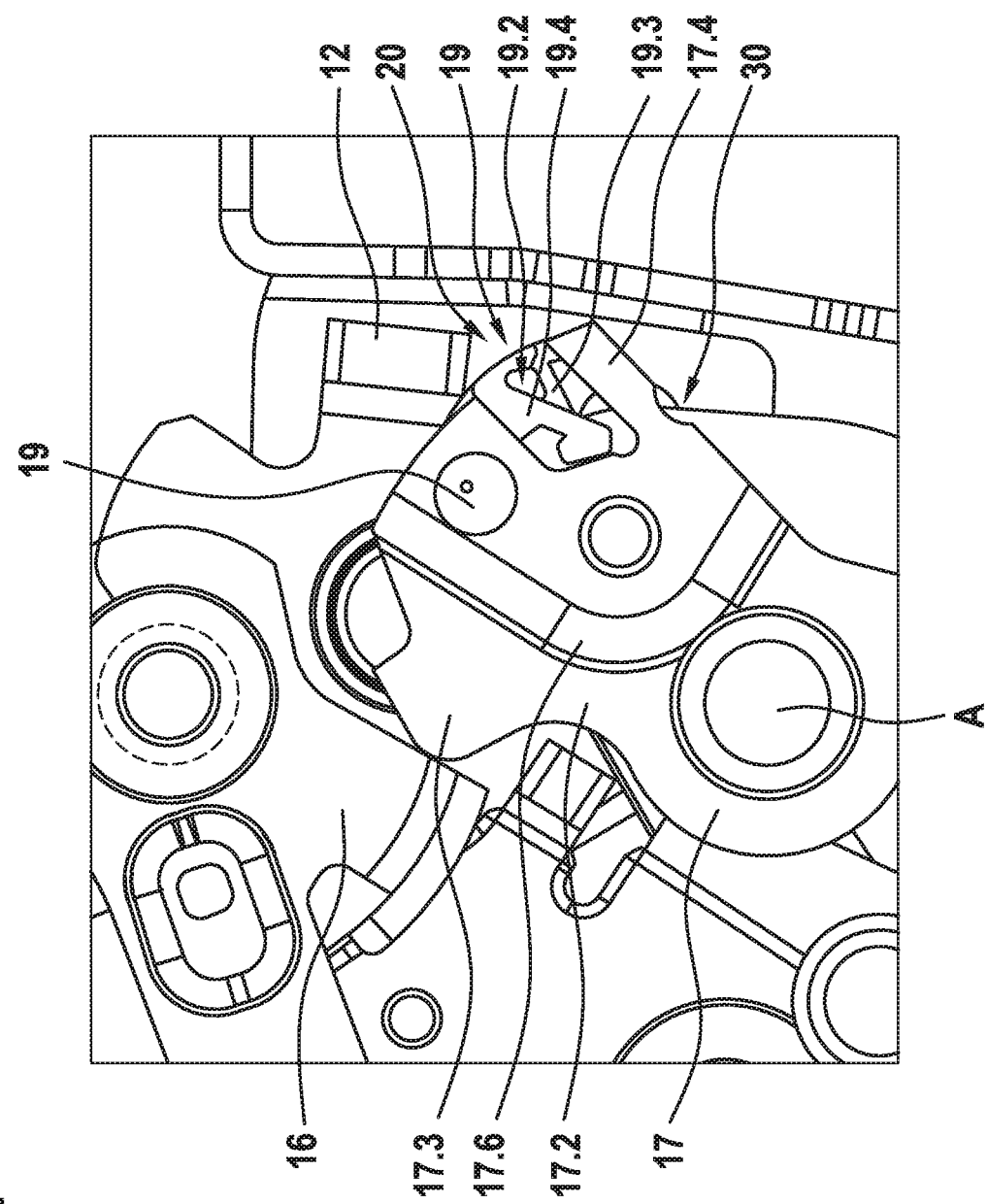
Figure 5:
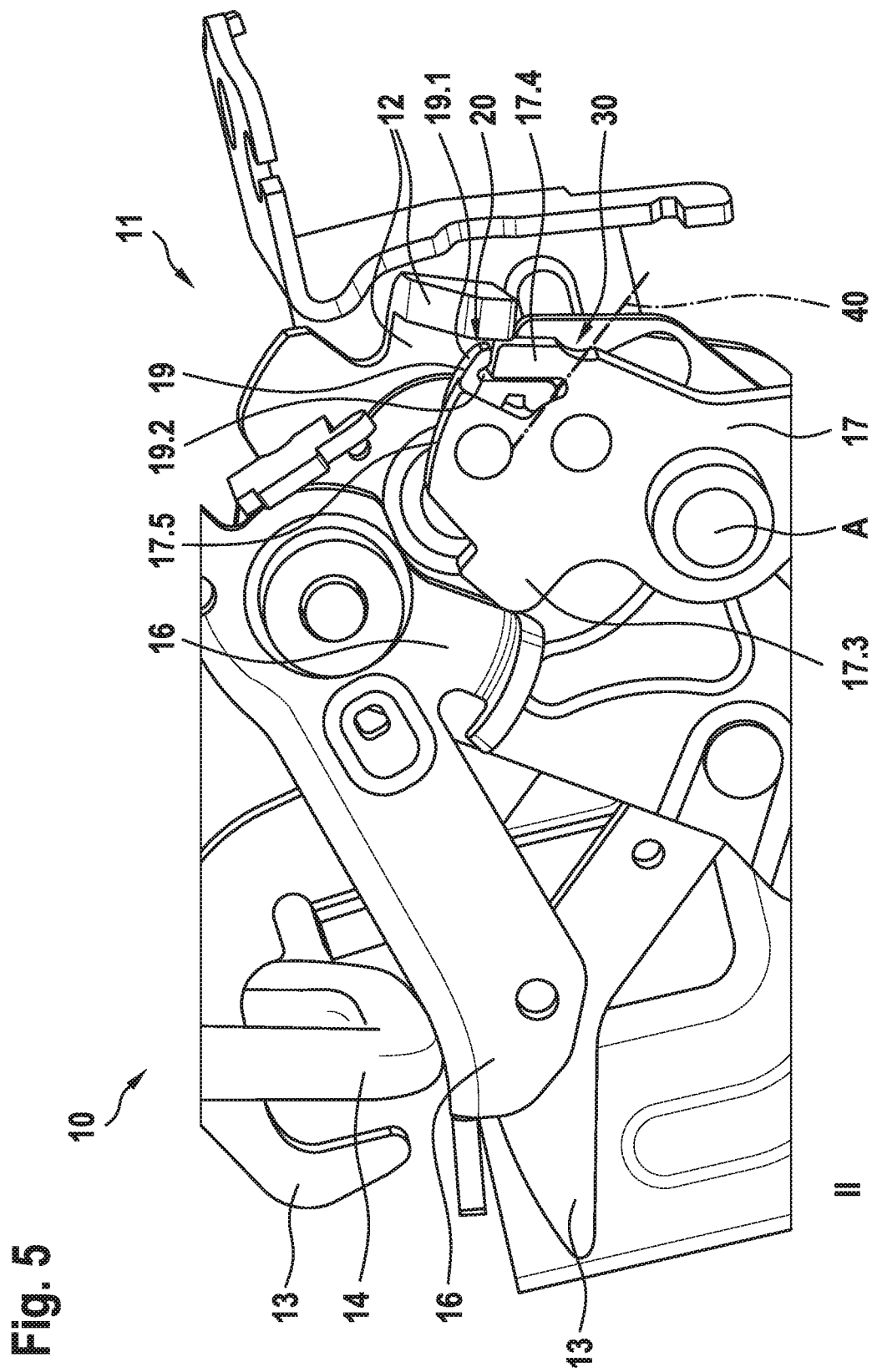
Figure 6:
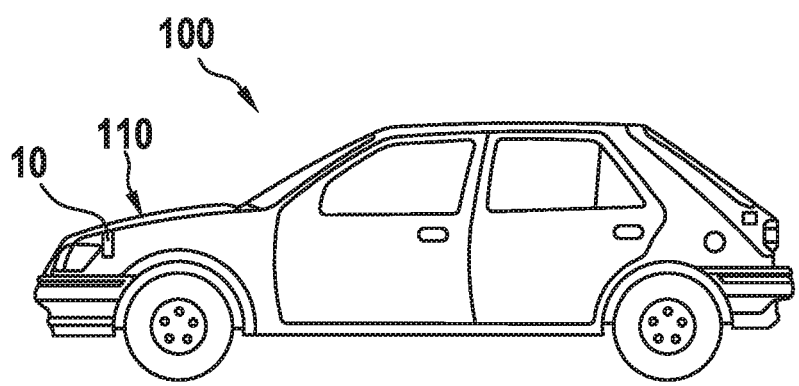

Shown are:

FIG. 1 a first potential embodiment of a locking device according to the invention, FIG. 2 a second potential embodiment of a locking device according to the invention, FIG. 3 a detail of a locking device according to the invention in the area of the overload protector in the first embodiment, FIG. 4 a detail of a locking device according to the invention in the area of the overload protector in the second embodiment, FIG. 5 the second potential embodiment of a locking device according to the invention in the impact position, and FIG. 6 a motor vehicle having a movable part and a locking device according to the invention.

FIG. 1 illustrates a first potential embodiment of a locking device 10 according to the invention. According to the invention, the locking device features a locking mechanism 11 which is supportable or mountable on a body of a vehicle. It is also conceivable for the locking mechanism 11 to be arranged on a movable part of a vehicle. In the embodiment shown, the locking mechanism 11 comprises a pawl 12 and a rotary latch 13. The pawl 12 and the rotary latch 13 can be brought into operative engagement so that a lock holder 14 can be latched by the locking mechanism 11. The lock holder 14 is preferably arranged on a movable part of a vehicle, e.g. a hood or lid. Accordingly, the movable part of the vehicle can be immovably held in a closed position by the locking mechanism 11 so as to prevent movement into an open position. The locking device 10 further features a raising mechanism 15. This raising mechanism 15 comprises at least one raising lever 16, a drive lever 17, and an activation means 18.

The raising mechanism 15 enables the movable part to be elevated, with the locking mechanism 11 simultaneously latching the lock holder 14. An activation means 18 is provided for this purpose and is, for example, designed as a pyrotechnic activation means which exerts a force on the drive lever 17 by means of pyrotechnic action. The drive lever 17 diverts this force to the raising lever 16 so that the latter comes into contact with the lock holder 14 and moves it in opposition to the force vector 50 shown.

FIG. 1 shows the locking device 10 in the protection position I, in which a movable part is elevated with respect to a closed position. The raising mechanism 15 is accordingly designed as a lever mechanism, as a result of which the force generated by the activation means 18 is able to be transmitted to the lock holder 14. In order to divert the force from the activation means 18 to the lock holder 14, the activation means 18 is associated with a guide lever 17. In FIG. 1, the activation means 18 is illustrated in an activated state, in which case contact between the activation means 18 and the guide lever 17 is designed such that the guide lever 17 is rotated about an axis A by a force from the activation means 18.

The guide lever 17 comprises an activation arm 17.1 and a raising arm 17.2. In FIG. 1, the activation arm 17.1 is in contact with the activation means 18. The raising arm 17.2 is simultaneously in contact with the raising lever 16. In this context, the raising arm 17.2 in the embodiment shown comprises an actuating element 17.3, which forms a curved contour of the raising arm 17.2 and is in contact with the raising lever 16. In an accident, i.e., when a person strikes the movable part, the force 50 acts on the raising lever 16, thereby transmitting the force to the raising lever 16 via the lock holder 14. In order to then at least reduce injuries to the person involved in the accident, it is desirable for the movable part to yield in the direction of force vector 50 so that the impact forces can at least be partially diverted to move the movable part from the protection position I into an impact position II. In the impact position, the movable part is again moved by a defined distance towards the closed position.

In order to lower the movable part and, therefore, the raising lever 16, it is proposed according to the invention that an overload protector 20 be arranged on the guide lever 17. Moreover, as shown in FIG. 1, it is preferable for a second overload protector 30 to be provided. In FIG. 1, the overload protector 20 features a material recess 20. This recess is formed on the guide lever 17 between a support element 17.4 and the actuating element 17.3. Moreover, a support contour 17.5 is formed in the area between the support element 17.4 and the actuating element 17.3, in which case the pawl 12 can be guided along the support contour 17.5 during a movement between a blocking position, in which the rotary latch is blocked, and the released position.

As previously explained, the locking device 10 in FIG. 1 is located in the protection position I, in which the locking mechanism 11 is latching the lock holder 14. The rotary latch 13 is arranged around the lock holder 14 for this purpose, with the pawl 12 blocking the rotary latch 13 at the same time. In this case, the pawl 12 contacts the drive lever 17 in the area of the support element 17.4, the support element 17.4 thus lying against the pawl 12.

The drive lever 17 in FIG. 1 further features a second overload protector 30 in the area of the support element 17.4.

In the embodiment according to FIG. 1, overload protector 20 and overload protector 30 are, by way of example, designed as notches in order to enable a deformation of the support element if the raising lever 16 is moved into the impact position.

FIG. 2 shows a further potential embodiment of the locking device 10 according to the invention. In this context, the only difference in the second embodiment is an additional guide element 19 on the overload protector 20. Accordingly, the following will address only the differences in detail.

The guide element 19 according to the invention features a first support arm 19.3 and a second support arm 19.4. Both support arms 19.3 and 19.4 are in this case arranged to overlap at least in portions and are arranged in the overload protector, hence (in FIG. 2) in the material recess 20. In FIG. 2, both support arms 19.3 and 19.4 are arranged one behind the other (based on the frontal view shown). A recess 19.2 and a guide contour 19.1 are formed by means of this arrangement and the essentially Z-shaped design of the support arms 19.3 and 19.4. The guide contour 19.1 enables the support contour 17.5 of the drive lever 17 to continue despite the material recess 20. As a consequence, the advantage of the guide contour 19.1 is that the pawl 12 will not slip into or get stuck in the material recess 20 when sliding across the support contour 17.5. Moreover, the two support arms form a recess 19.2 for the support element 17.4 in case the support element 17.4 is deformed about the bending axis 40 (as will be explained in more detail hereinafter).

FIG. 3 shows a detail of the locking device according to the invention from FIG. 1. In particular, FIG. 3 illustrates the overload protection area 21 comprising overload protector 20 and overload protector 30. Further shown is the cooperation between the mechanisms of the raising mechanism 15, which consists of the pawl 12, the raising lever 16, and the drive lever 17.

The raising lever 16 is illustrated only in the contact area for the drive lever. The raising lever and the drive lever come into contact on the actuating element 17.3 in the area of the raising arm 17.2 of the drive lever 17. The raising arm 17.2, which is formed on the upper part of the drive arm 17, further comprises a reinforcement contour 17.6 in the area of the first and second overload protectors 20, 30. The reinforcement contour 17.6 can be designed as a shape or a material reinforcement and reinforces the drive lever 17 in the area of the raising arm 17.2 otherwise weakened by the overload protectors 20, 30.

FIG. 3 further shows the contact between the pawl 12 and the support element 17.4, as a result of which movement of the raising lever 16 towards an impact position (i.e., a lowering of the movable part) is at least partially inhibited.

FIG. 4 shows a partial view of the locking device 10 from FIG. 2. The locking device is nevertheless located in the closed position. In this context, the term "closed position" describes a position of the movable part, e.g. a hood or a lid, in which said part is arranged essentially flush with the body of the vehicle. This corresponds to the normal position of the hood or lid when the motor vehicle is being driven. As a result, the raising lever 16 in FIG. 4 is slightly lowered as compared to that in FIGS. 1 to 3.

As a consequence, the drive lever 17, which is in contact with the raising lever 16, rotates around axis A. As previously explained in regard to FIG. 2, the drive lever 17 in FIG. 4 also features a guide element 19 according to the invention, so, for the design details thereof, reference is made to the description of FIG. 2.

FIG. 5 shows a second potential embodiment according to the invention in which, as shown in FIGS. 2 and 5, the locking device 10 is in the impact position II.

In the impact position II, the support element 17.4 is deformed within the recess 19.2 of the guide element 19 and about the bending axis 40. It is clearly evident that the inventive guide contour 19.1 of the guide element 19 then at least reduces, or even completely prevents, the otherwise potential risk of the pawl 12 catching on the drive lever 17. The rounded guide contour 19.1 adjoins the guide contour 17.5 of the guide lever 17. As a consequence, the pawl can be moved back after reaching the impact position so that the locking device is actuable even after a person has impacted the movable part. The guide element 19 thus guarantees the flawless function of the locking mechanism even after an accident.

FIG. 6 shows a vehicle 100 in the form of a motor vehicle 100. The motor vehicle 100 features a movable part 110 in the form of a hood, in particular an engine cover, having a locking device 10 according to the invention. During an accident with, for example, a pedestrian or cyclist, the hood 110 would, by means of the locking device 10 according to the invention, first be moved into a protection position in which the hood 110 is elevated by a defined positioning distance. If a person then falls onto the hood 110, then the hood can, by virtue of the first and/or second overload protector, be moved into the impact position by means of the locking device 10 according to the invention, with the result that the risk of serious injuries to said person is able to be reduced.

The foregoing explanation of the embodiments describes the present invention solely within the scope of examples. Insofar as technically practical, specific features of the embodiments may obviously be combined at will with one another without departing from the scope of the present invention.

LIST OF REFERENCE SIGNS

10 Locking device
11 Locking mechanism
12 Pawl
13 Rotary latch
14 Lock holder
15 Raising mechanism
16 Raising lever
17 Drive lever
17.1 Activation arm
17.2 Raising arm
17.3 Actuating element
17.4 Support element
17.5 Support contour
17.6 Reinforcement contour
18 Activation means
19 Guide element
19.1 Guide contour
19.2 Recess for the support element
19.3 First support arm
19.4 Second support arm
20 First overload protector
21 Overload protection area
30 Second overload protector
40 Bending axis
50 Force vector in a load condition
100 Vehicle
110 Movable part
I Protection position
II Impact position
A Rotational axis of the drive lever

The invention claimed is:

1. A locking device for a movable part of a vehicle, the movable part being movable between an open position and a closed position, the locking device comprising:
   a locking mechanism configured to be mounted on a body side of the vehicle and configured for receiving a lock holder that is arranged on the movable part, and
   a raising mechanism engageable with the lock holder and configured for moving the movable part from the closed position in an opening direction into at least one protection position that is between the open position and the closed position,
   wherein the raising mechanism includes a drive lever having at least one first overload protector which enables plastic deformation of the drive lever during an excessive load whereby the movable part is moved from the at least one protection position into an impact position only during the excessive load, and wherein the movable part is configured to return to the closed position from the impact position after the excessive load is ceased.

2. The locking device according to claim 1, wherein the raising mechanism includes a raising lever, wherein the drive lever is connectable to the raising lever and the locking mechanism, and wherein the drive lever is activated by a force exerted against the drive lever.

3. The locking device according to claim 2, wherein the first overload protector is arranged on the drive lever.

4. The locking device according to claim 2, wherein the first overload protector is formed as a material recess on the drive lever whereby the first overload protector constitutes a breaking point that enables plastic deformation of the drive lever during the excessive load.

5. The locking device according to claim 2, wherein the drive lever includes an activation arm and a raising arm, wherein the raising arm includes an actuating element that is configured to contact the raising lever and a support element configured to contact the locking mechanism, and wherein the first overload protector is arranged on a guide contour of the drive lever which connects the actuating element and the support element.

6. The locking device according to claim 5, wherein the locking mechanism includes a pawl that slides, at least during a movement of the movable part and at least along portions of the guide contour, from the impact position into the protection position, a closed position, and/or an open position.

7. The locking device according to claim 1, wherein a guide element having a guide contour is arranged on the first overload protector of the drive lever, and that the guide contour is able to be brought into contact with a pawl of the locking mechanism during a movement of the movable part from the impact position into the protection position, the closed position, and/or the open position.

8. The locking device according to claim 5, wherein, in the load condition, the support element is deformed within the first overload protector, wherein the guide element comprises a recess for the support element and the support element can be arranged within the recess in the load condition.

9. The locking device according to claim 2, wherein the drive lever includes a second overload protector formed as a notch on the drive lever.

10. The locking device according to claim 7, wherein the guide element includes at least one support arm that is Z-shaped.

11. A method of actuation for a locking device for a movable part of a vehicle according to claim 1, the locking device being configured for an accident-related load condition in which the movable part is located in a protection position, said method comprising the following steps:
a) rotating a vehicle-side raising lever about an axis while transmitting a defined impact force from a lock holder arranged on the movable part to the vehicle-side raising lever,
b) rotating a drive lever about a further axis while applying a load torque from the raising lever to the drive lever,
c) triggering at least one overload protector on the drive lever, and
d) lowering the movable part from the protection position into an impact position.

12. The locking device according to claim 1, wherein the protection position is defined by the movable part being arranged at a distance in the opening direction of movement relative to the closed position of the movable part.

13. The locking device according to claim 12, wherein the protection position is defined by the movable part being elevated by a distance that is between 10 and 50 millimeters relative to the closed position of the movable part.

14. The locking device according to claim 12, wherein the load is a force exerted by the lock holder on the locking mechanism during a movement of the locking mechanism towards a closed position.

15. The locking device according to claim 4, wherein the drive lever is supported on a pawl of the locking mechanism.

16. The locking device according to claim 15, wherein the recess is arranged between a first contact point between the drive lever and the pawl and a second contact point between the drive lever and the raising lever.

17. The locking device according to claim 15, wherein the drive lever is deformable along a bending axis during the load condition.

18. The locking device according to claim 5, wherein the actuating element forms a curved contour of the raising arm.

19. A locking device for a movable part of a vehicle, the locking device comprising:
a locking mechanism which can be mounted on a body side of the vehicle and is configured for receiving a lock holder that is arrangeable on the movable part, and
a raising mechanism which can be brought into contact with the lock holder and is configured for moving the movable part into at least one protection position, wherein the raising mechanism includes at least one first overload protector which enables the movable part to, when in a load condition, be movable from the protection position into an impact position,
wherein the raising mechanism includes a raising lever, wherein the drive lever is connectable to the raising lever and the locking mechanism, and wherein the drive lever is activated by a force exerted against the drive lever, and
wherein the first overload protector is formed as a material recess on the drive lever whereby the first overload protector constitutes a breaking point that enables plastic deformation of the drive lever during the load condition.

20. A locking device for a movable part of a vehicle, the locking device comprising:
a locking mechanism which can be mounted on a body side of the vehicle and is configured for receiving a lock holder that is arrangeable on the movable part, and
a raising mechanism which can be brought into contact with the lock holder and is configured for moving the movable part into at least one protection position, wherein the raising mechanism includes at least one first overload protector which enables the movable part to, when in a load condition, be movable from the protection position into an impact position,
wherein the raising mechanism includes a raising lever, wherein the drive lever is connectable to the raising lever and the locking mechanism, and wherein the drive lever is activated by a force exerted against the drive lever,
wherein the drive lever includes an activation arm and a raising arm, wherein the raising arm includes an actuating element that is configured to contact the raising lever and a support element configured to contact the locking mechanism, and wherein the first overload protector is arranged on a guide contour of the drive lever which connects the actuating element and the support element, and wherein the locking mechanism includes a pawl that slides, at least during a movement of the movable part and at least along portions of the guide contour, from the impact position into the protection position, a closed position, and/or an open position.

\* \* \* \* \*